(12) United States Patent
Yin et al.

(10) Patent No.: US 10,197,776 B2
(45) Date of Patent: Feb. 5, 2019

(54) CAMERA LENS

(71) Applicant: ZHEJIANG SUNNY OPTICS CO., LTD., Ningbo (CN)

(72) Inventors: Zhidong Yin, Ningbo (CN); Fujian Dai, Ningbo (CN)

(73) Assignee: ZHEJIANG SUNNY OPTICS CO., LTD., Ningbo (CN)

(*) Notice: Subject to any disclaimer, the term of this patent is extended or adjusted under 35 U.S.C. 154(b) by 0 days.

(21) Appl. No.: 15/552,070

(22) PCT Filed: Jul. 5, 2016

(86) PCT No.: PCT/CN2016/088626
§ 371 (c)(1),
(2) Date: Aug. 18, 2017

(87) PCT Pub. No.: WO2017/166475
PCT Pub. Date: Oct. 5, 2017

(65) Prior Publication Data
US 2018/0136443 A1 May 17, 2018

(30) Foreign Application Priority Data
Apr. 1, 2016 (CN) .......................... 2016 1 0204455

(51) Int. Cl.
*G02B 13/18* (2006.01)
*G02B 3/02* (2006.01)
(Continued)

(52) U.S. Cl.
CPC ............... *G02B 13/06* (2013.01); *G02B 9/62* (2013.01); *G02B 13/0045* (2013.01); *G02B 27/0025* (2013.01)

(58) Field of Classification Search
CPC .... G02B 13/06; G02B 13/18; G02B 13/0045; G02B 13/16; G02B 9/60; G02B 9/62; G02B 27/0025; G02B 13/04; G02B 27/0028
See application file for complete search history.

(56) References Cited

U.S. PATENT DOCUMENTS 6,268,965 B1 7/2001 Enomoto
6,384,987 B1 5/2002 Sensui
(Continued)

FOREIGN PATENT DOCUMENTS

CN 105204143 A 12/2015
CN 205003346 U 1/2016
(Continued)

OTHER PUBLICATIONS

International Search Report issued in PCT/CN2016/088826 dated Dec. 26, 2016 (7 pages).
(Continued)

*Primary Examiner* — Alicia M Harrington
(74) *Attorney, Agent, or Firm* — Osha Liang LLP

(57) ABSTRACT

A camera lens is provided. The camera lens includes, in sequence from an object side to an image side: a first lens having a negative refractive power; a second lens having a positive refractive power, an object-side surface of the second lens being configured as a convex surface, and an image-side surface of the second lens being configured as a convex surface; a third lens having a negative refractive; a fourth lens having a refractive power; a fifth lens having a positive refractive power, an image-side surface of the fifth lens being configured as a convex surface; a sixth lens having a negative refractive power, an image-side surface of the sixth lens being configured as a concave surface.

9 Claims, 12 Drawing Sheets

(51) Int. Cl.
*G02B 13/06* (2006.01)
*G02B 9/62* (2006.01)
*G02B 27/00* (2006.01)
*G02B 13/00* (2006.01)

(56) References Cited

U.S. PATENT DOCUMENTS

2002/0041449 A1  4/2002  Eguchi et al.
2016/0341933 A1* 11/2016 Liu .................... G02B 13/0045

FOREIGN PATENT DOCUMENTS

| | | |
|---|---|---|
| JP | S62173415 A | 7/1987 |
| JP | 2011034106 A | 2/2011 |
| JP | 2015125150 A | 7/2015 |
| WO | 2012127826 A1 | 9/2012 |

OTHER PUBLICATIONS

Written Opinion of the International Searching Authority issued in PCT/CN2016/088626 dated Dec. 26, 2016 (8 pages).
Office Action issued in corresponding Japanese Application No. 2017542051 dated Aug. 28, 2018, and English translation thereof (11 pages).

* cited by examiner

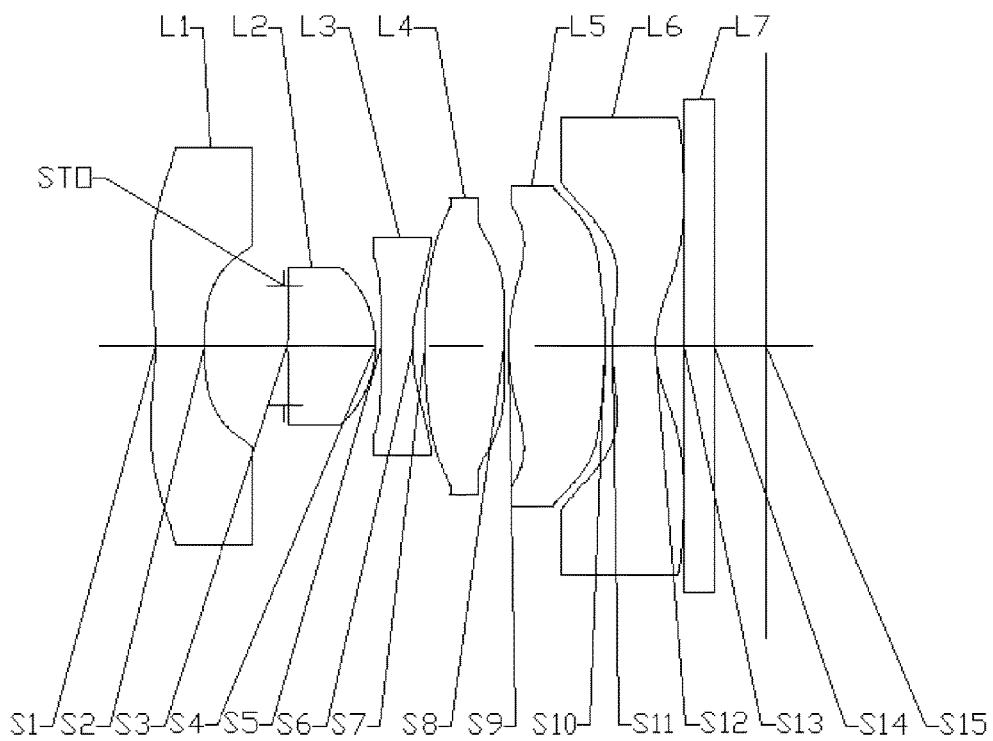
Fig. 21
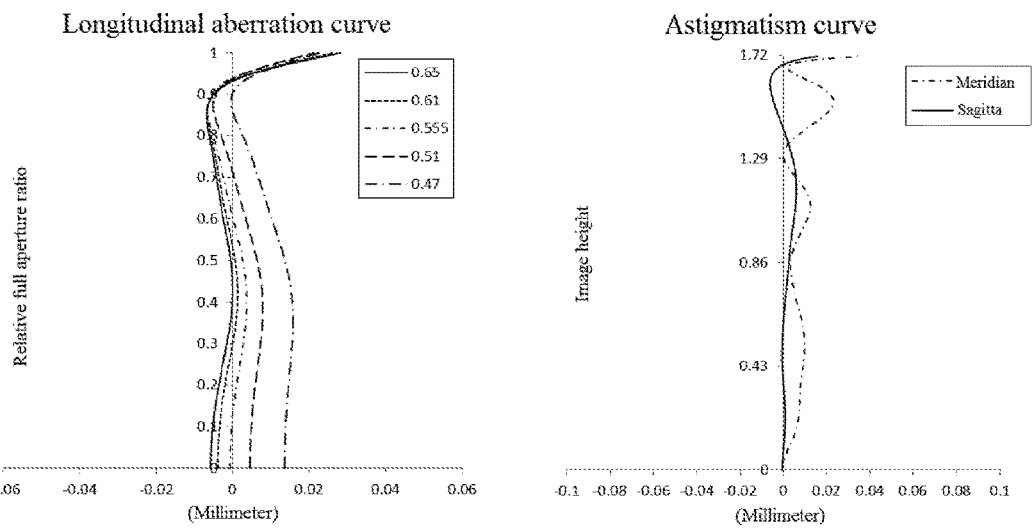
Fig. 22
Fig. 23

CAMERA LENS

CROSS-REFERENCE TO RELATED APPLICATIONS

The present application is a U.S. National Phase application under 35 USC § 371 of the International Patent Application No. PCT/CN2016/088626, filed on Jul. 5, 2016, which claims the benefit of prior Chinese Application No. 201610204455.4, filed with the State Intellectual Property Office of P. R. China on Apr. 1, 2016. The entire contents of the before-mentioned patent applications are incorporated by reference as part of the disclosure of this U.S. application.

FIELD

The present disclosure relates to a field of cameras, and more particularly to a camera lens with an ultra-wide angle.

BACKGROUND

In recent years, with developments of science and technology, portable electronic products are rising gradually, and especially the portable electronic product with a camera function is more popular with people. More and more kinds of image acquisition devices are developed gradually, and a camera lens which may be applied to the image acquisition devices in various imaging fields is more popular in the market. A photosensitive element in a common optical system generally includes nothing more than a charge coupled device (CCD) or a complementary metal oxide semiconductor (CMOS). With progresses of a semiconductor process technology, the optical system trends to have a higher resolution, a pixel size of the photosensitive element becomes smaller and smaller, and a requirement for imaging quality of the matched optical system becomes higher and higher.

SUMMARY

Embodiments of the present disclosure seek to solve at least one of problems existing in the related art to at least some extent. For that reason, a camera lens is provided by the present disclosure.

The camera lens, in sequence from an object side to an image side, includes:

a first lens having a negative refractive power, an image-side surface of the first lens being configured as a concave surface;

a second lens having a positive refractive power, an object-side surface of the second lens being configured as a convex surface, and an image-side surface of the second lens being configured as a convex surface;

a third lens having a negative refractive power, an image-side surface of the third lens being configured as a concave surface;

a fourth lens having a refractive power;

a fifth lens having a positive refractive power, an image-side surface of the fifth lens being configured as a convex surface;

a sixth lens having a negative refractive power, an image-side surface of the sixth lens being configured as a concave surface, wherein the camera lens satisfies a following relational expression: $2<\tan(HFOV)<9$, in which HFOV denotes a half of a largest field angle of the camera lens.

The camera lens satisfying the above configuration may achieve an ultra-wide angle, have a homogeneous image quality and a high restoration, and may be applied to image acquisition devices of various imaging fields. In addition, the camera lens satisfying the above configuration is miniaturized and compact in structure.

In an embodiment, the camera lens satisfies a following relational expression: $1<f5/f<2.5$, in which f5 denotes an effective focal length of the fifth lens; f denotes an effective focal length of the camera lens.

In an embodiment, the camera lens satisfies a following relational expression: $-2<f1/f2<0$, in which f1 denotes an effective focal length of the first lens; f2 denotes an effective focal length of the second lens.

In an embodiment, the camera lens satisfies a following relational expression: $|SAG62/DT62|<0.2$, in which SAG62 denotes an axial distance from an intersection point of the image-side surface of the sixth lens with an optical axis to a vertex of an effective radius of the image-side surface of the sixth lens; DT62 denotes the effective radius of the image-side surface of the sixth lens.

In an embodiment, the camera lens satisfies a following relational expression: $T23/T12<0.2$, in which T23 denotes an axial spacing distance between the second lens and the third lens; T12 denotes an axial spacing distance between the first lens and the second lens.

In an embodiment, the camera lens satisfies a following relational expression: $0.5<R2/R3<1.5$, in which R2 denotes a radius of curvature of the image-side surface of the first lens; R3 denotes a radius of curvature of the object-side surface of the second lens.

In an embodiment, the camera lens satisfies a following relational expression: $0<Dr5r8/TTL<0.5$, in which Dr5r8 denotes an axial distance from an object-side surface of the third lens to an image-side surface of the fourth lens; TTL denotes an axial distance from an object-side surface of the first lens to an imaging surface.

In an embodiment, the camera lens satisfies a following relational expression: $1<DT12/DT21<2$, in which DT12 denotes an effective radius of the image-side surface of the first lens; DT21 denotes an effective radius of the object-side surface of the second lens.

In an embodiment, the camera lens satisfies a following relational expression: $-2<f6/f<-0.8$, in which f6 denotes an effective focal length of the sixth lens; f denotes an effective focal length of the camera lens.

In an embodiment, an object-side surface of the third lens is configured as a convex surface, an object-side surface of the fourth lens is configured as a convex surface, and an image-side surface of the fourth lens is configured as a convex surface.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and/or other aspects and advantages of embodiments of the present disclosure will become apparent and readily appreciated from descriptions made with reference to following drawings, in which:

FIG. 21 is a schematic view of a camera lens according to embodiment 5;

FIG. 22 is a diagram showing a longitudinal aberration curve (mm) of the camera lens in embodiment 5; FIG. 23 is a diagram showing an astigmatism curve (mm) of the camera lens in embodiment 5.

DETAILED DESCRIPTION

Figure 1:
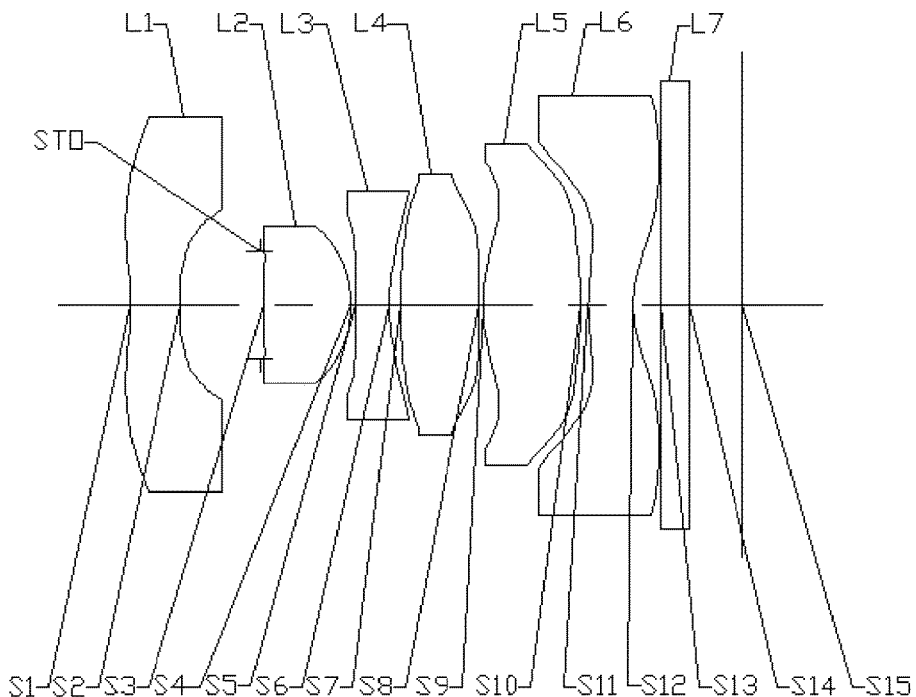
FIG. 1 is a schematic view of a camera lens according to embodiment 1.
Figure 2:
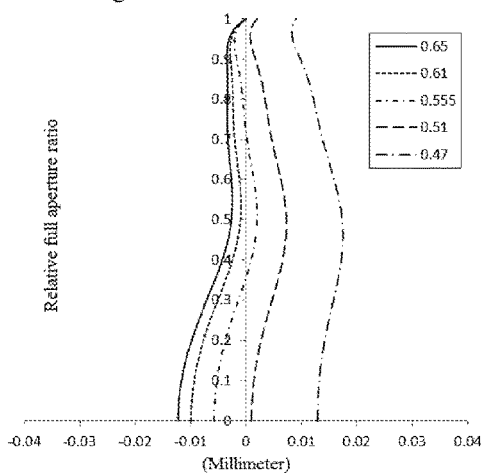
FIG. 2 is a diagram showing a longitudinal aberration curve (mm) of the camera lens in embodiment 1.
Figure 3:
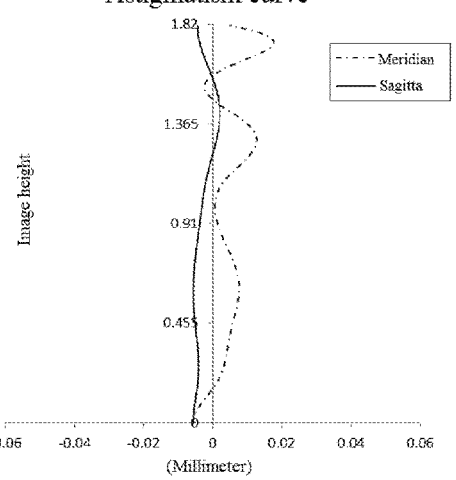
FIG. 3 is a diagram showing an astigmatism curve (mm) of the camera lens in embodiment 1.
Figure 4:
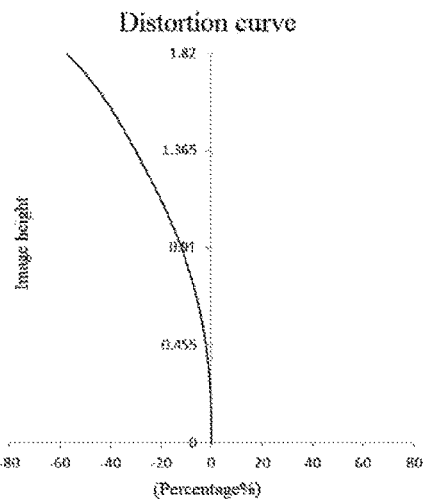
FIG. 4 is a diagram showing a distortion curve (%) of the camera lens in embodiment 1.
Figure 5:
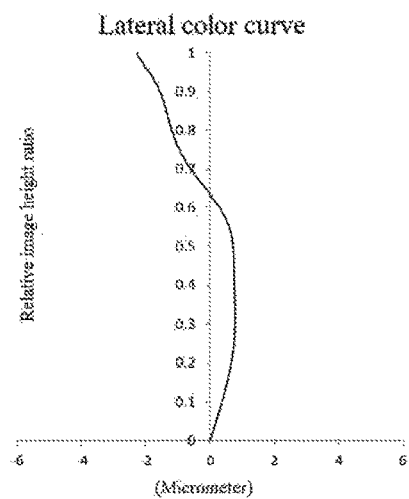
FIG. 5 is a diagram showing a lateral color curve (μm) of the camera lens in embodiment 1.
Figure 6:
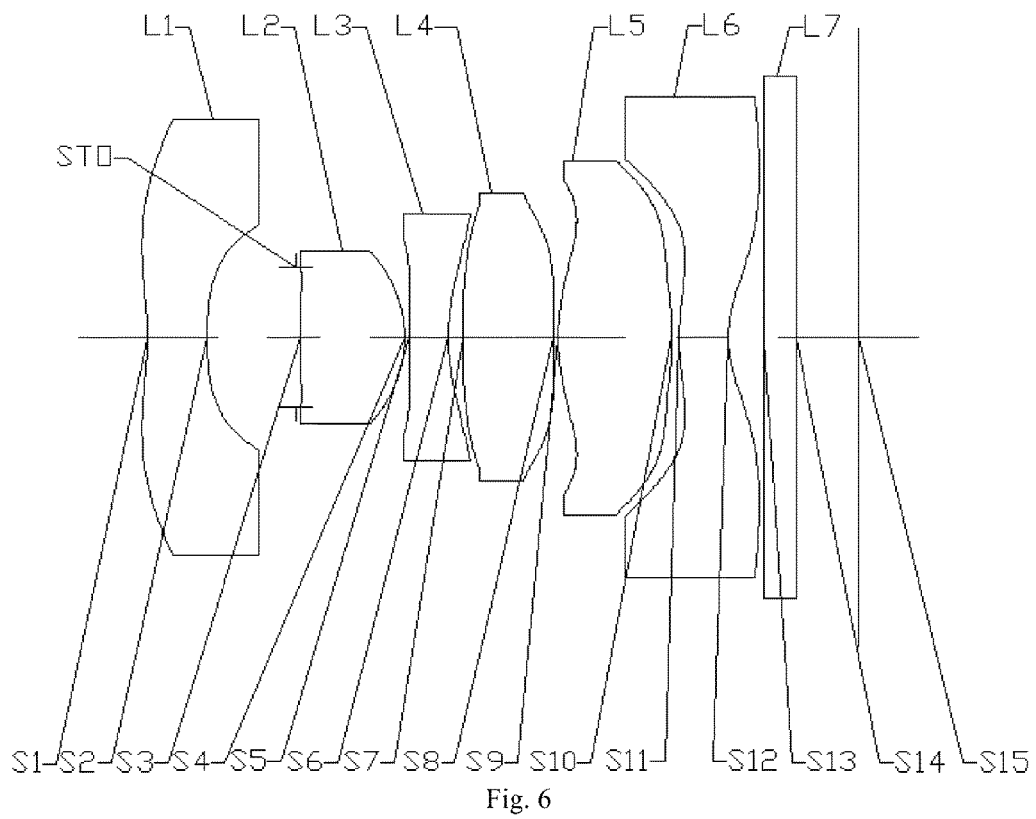
FIG. 6 is a schematic view of a camera lens according to embodiment 2.
Figure 7:
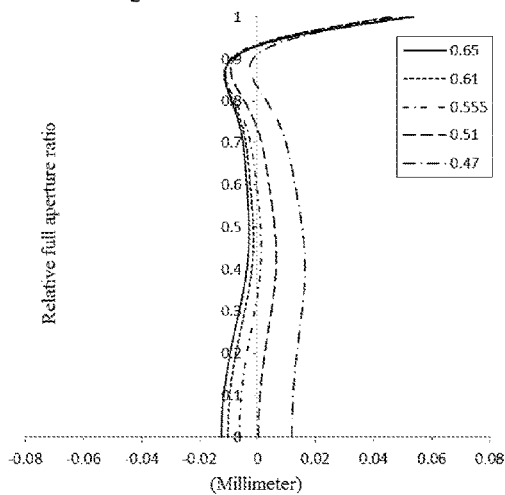
FIG. 7 is a diagram showing a longitudinal aberration curve (mm) of the camera lens in embodiment 2.
Figure 8:
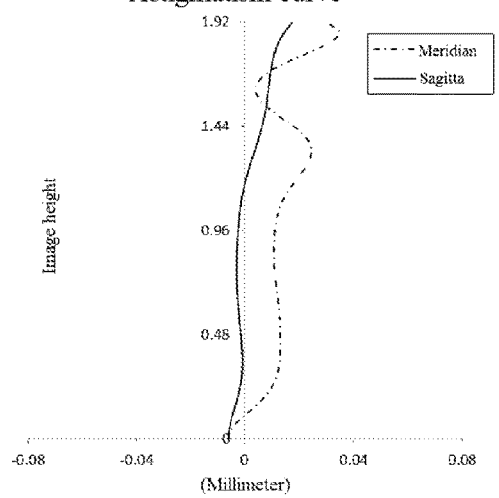
FIG. 8 is a diagram showing an astigmatism curve (mm) of the camera lens in embodiment 2.
Figure 9:
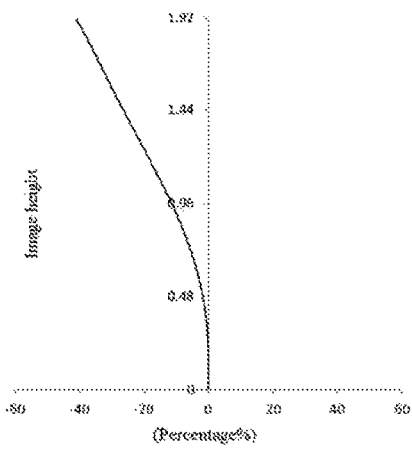
FIG. 9 is a diagram showing a distortion curve (%) of the camera lens in embodiment 2.
Figure 10:
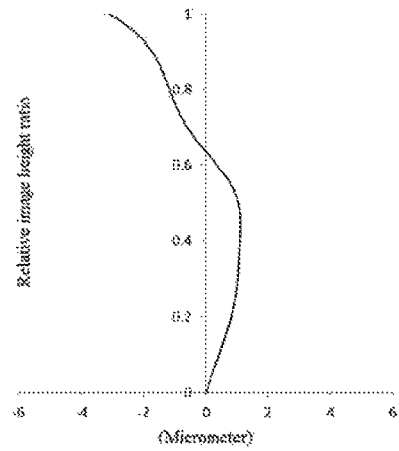
FIG. 10 is a diagram showing a lateral color curve (μm) of the camera lens in embodiment 2.
Figure 11:
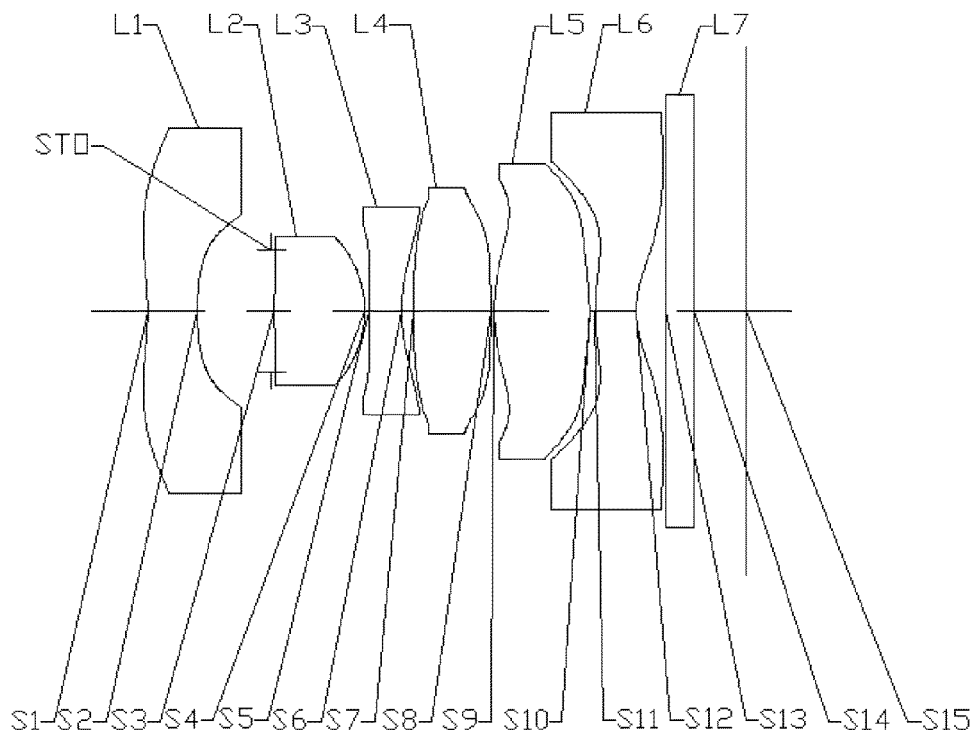
FIG. 11 is a schematic view of a camera lens according to embodiment 3.
Figure 12:
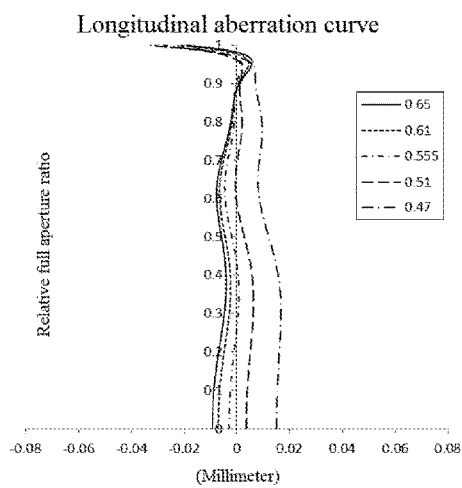
FIG. 12 is a diagram showing a longitudinal aberration curve (mm) of the camera lens in embodiment 3.
Figure 13:
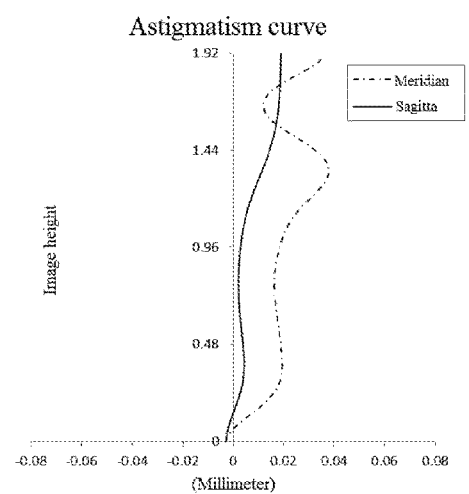
FIG. 13 is a diagram showing an astigmatism curve (mm) of the camera lens in embodiment 3.
Figure 14:
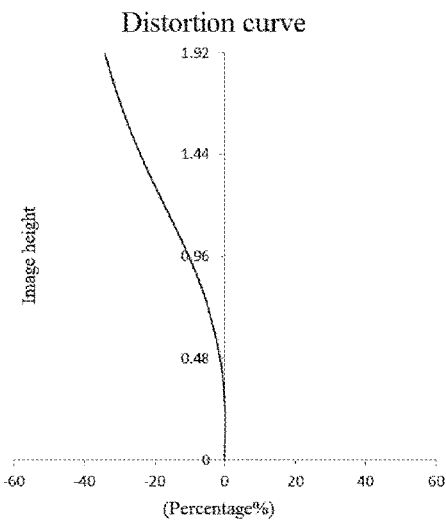
FIG. 14 is a diagram showing a distortion curve (%) of the camera lens in embodiment 3.
Figure 15:
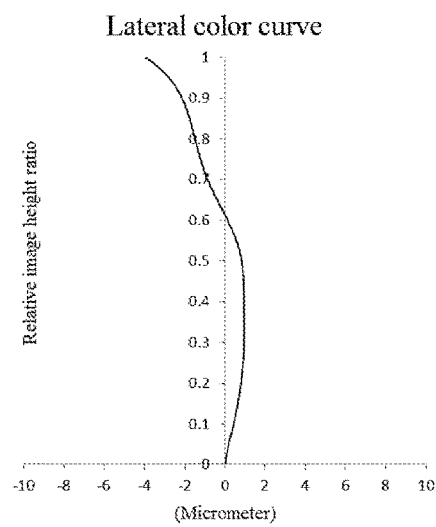
FIG. 15 is a diagram showing a lateral color curve (μm) of the camera lens in embodiment 3.
Figure 16:
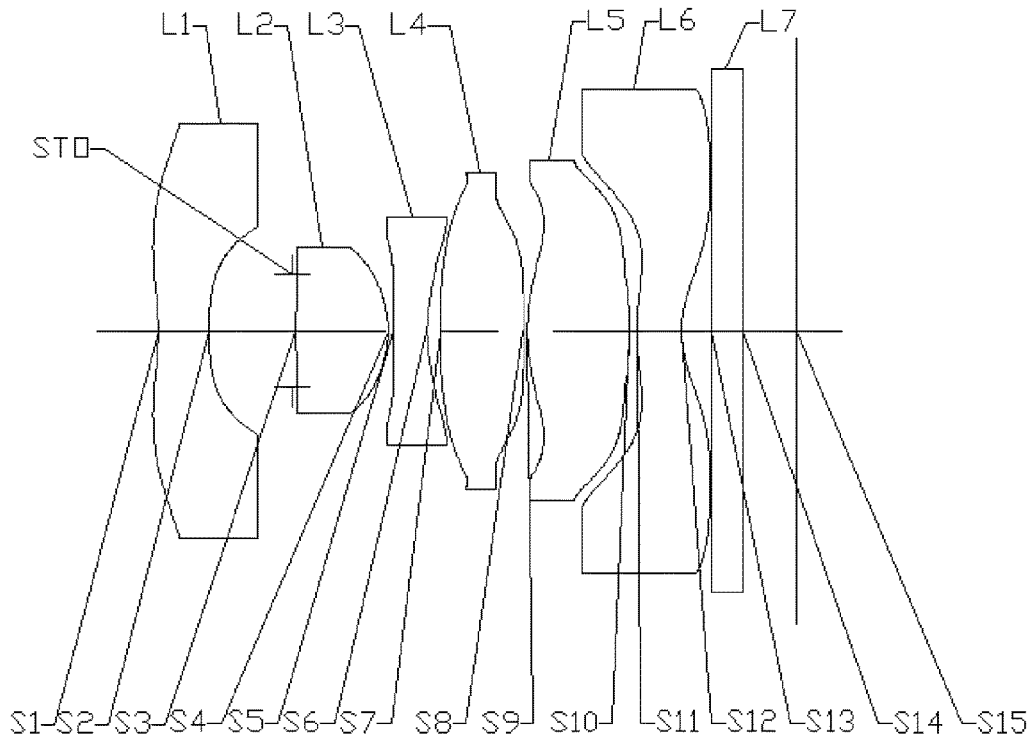
FIG. 16 is a schematic view of a camera lens according to embodiment 4.
Figure 17:
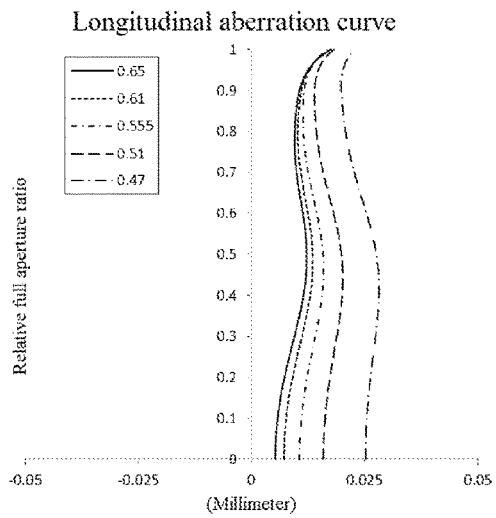
FIG. 17 is a diagram showing a longitudinal aberration curve (mm) of the camera lens in embodiment 4.
Figure 18:
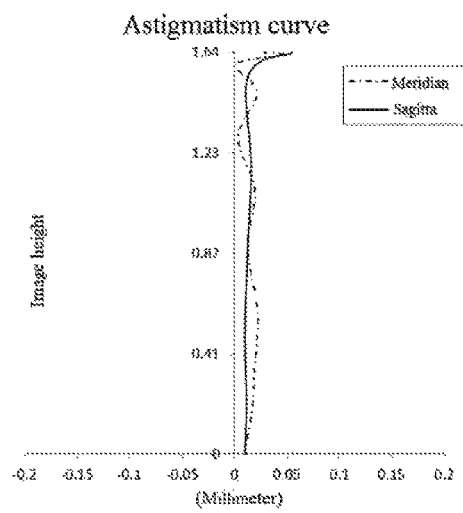
FIG. 18 is a diagram showing an astigmatism curve (mm) of the camera lens in embodiment 4.
Figure 19:
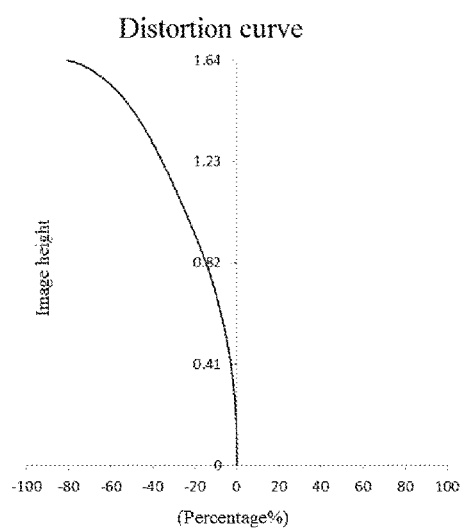
FIG. 19 is a diagram showing a distortion curve (%) of the camera lens in embodiment 4.
Figure 20:
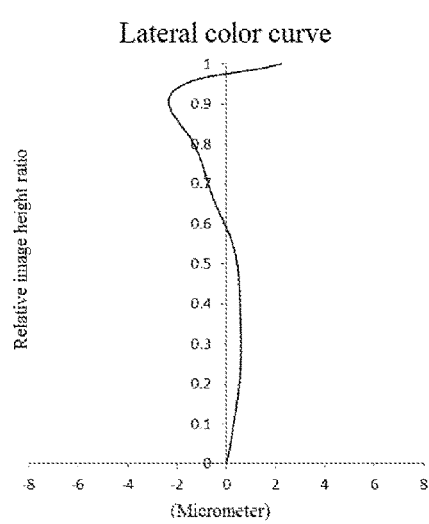
FIG. 20 is a diagram showing a lateral color curve (μm) of the camera lens in embodiment 4.
Figure 24:
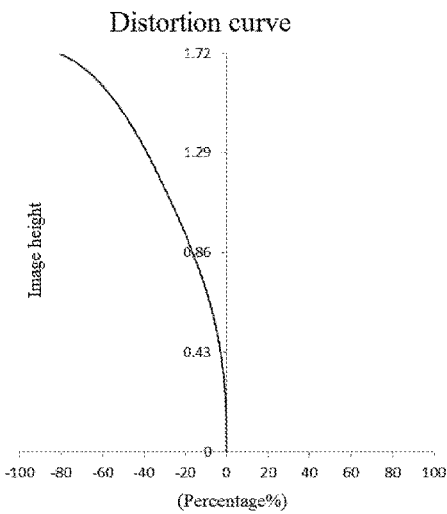
FIG. 24 is a diagram showing a distortion curve (%) of the camera lens in embodiment 5.
Figure 25:
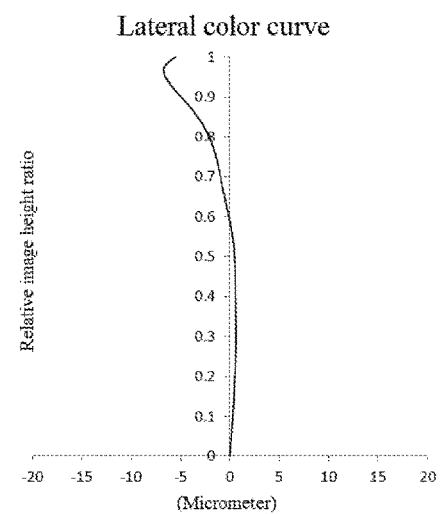
FIG. 25 is a diagram showing a lateral color curve (μm) of the camera lens in embodiment 5.
Figure 26:
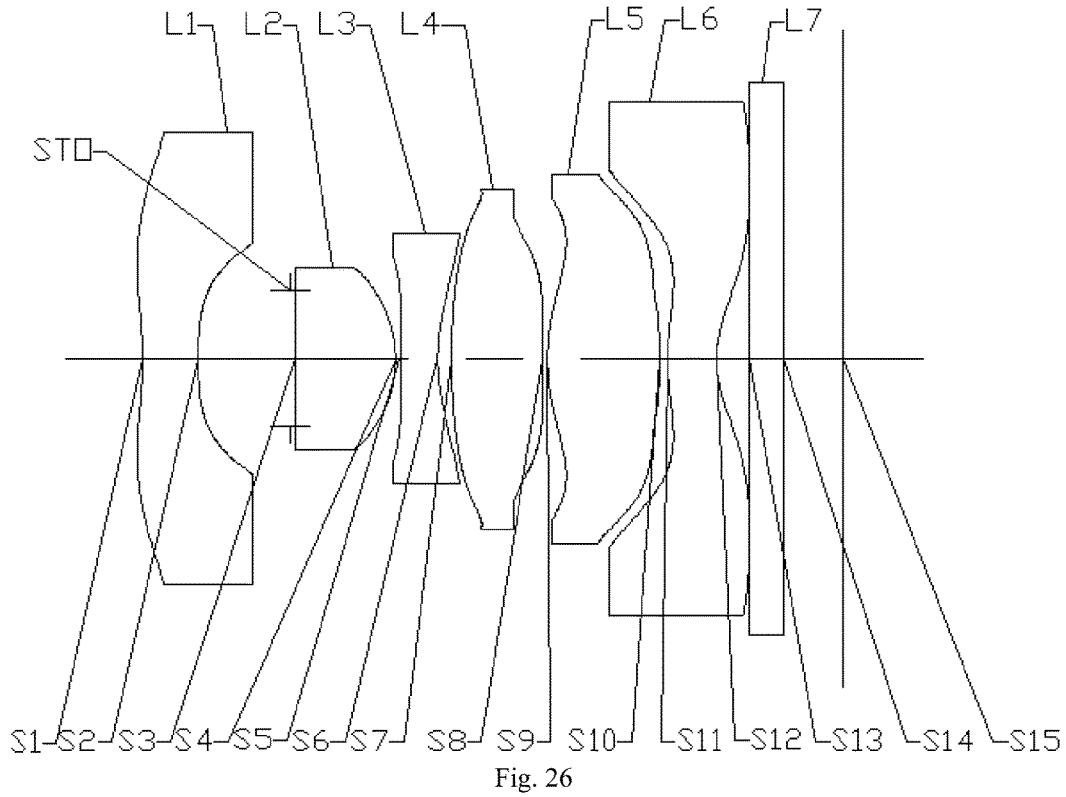
FIG. 26 is a schematic view of a camera lens according to embodiment 6.
Figure 27:
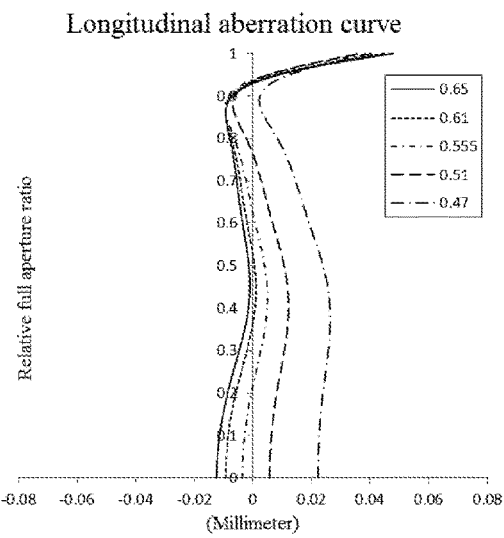
FIG. 27 is a diagram showing a longitudinal aberration curve (mm) of the camera lens in embodiment 6.
Figure 28:
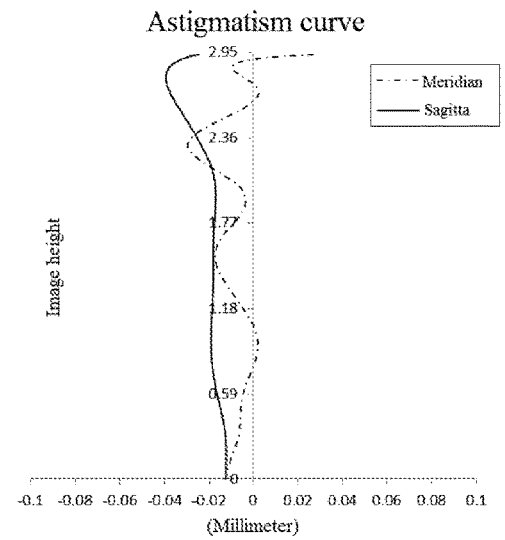
FIG. 28 is a diagram showing an astigmatism curve (mm) of the camera lens in embodiment 6.
Figure 29:
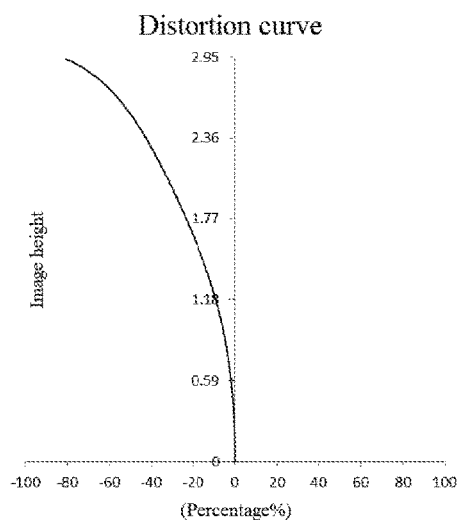
FIG. 29 is a diagram showing a distortion curve (%) of the camera lens in embodiment 6.
Figure 30:
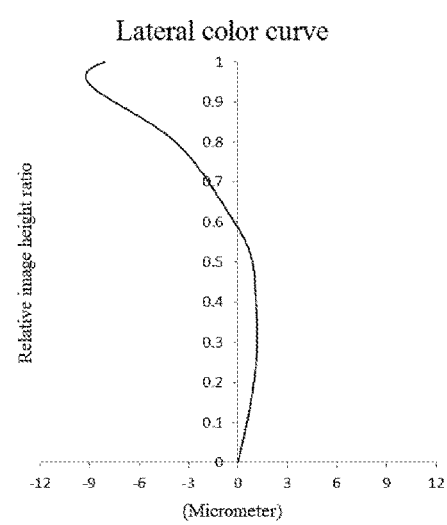
FIG. 30 is a diagram showing a lateral color curve (μm) of the camera lens in embodiment 6.
Figure 31:
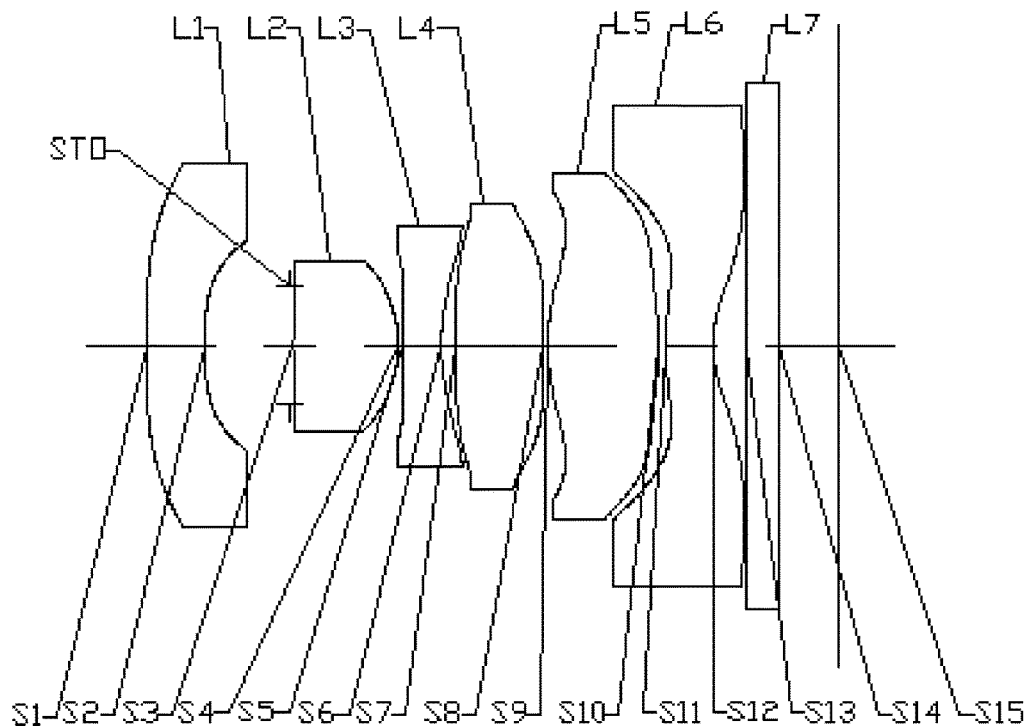
FIG. 31 is a schematic view of a camera lens according to embodiment 7.
Figure 32:
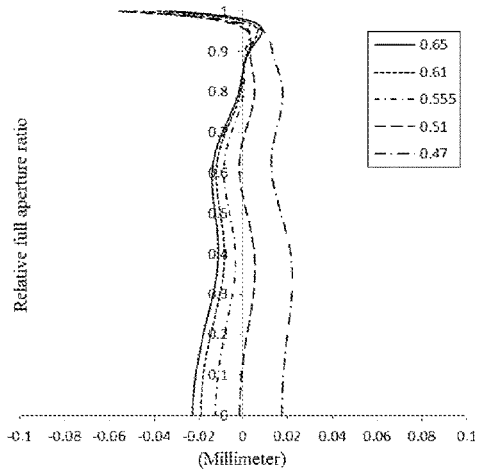
FIG. 32 is a diagram showing a longitudinal aberration curve (mm) of the camera lens in embodiment 7.
Figure 33:
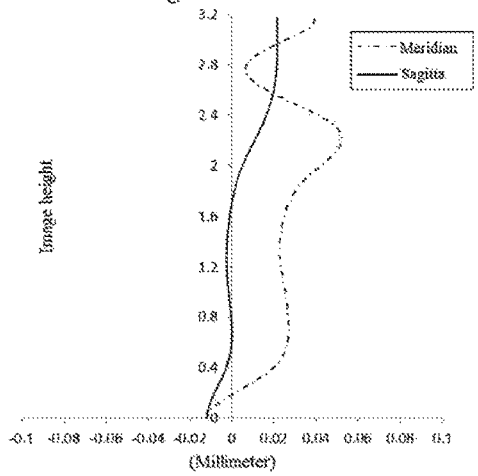
FIG. 33 is a diagram showing an astigmatism curve (mm) of the camera lens in embodiment 7.
Figure 34:
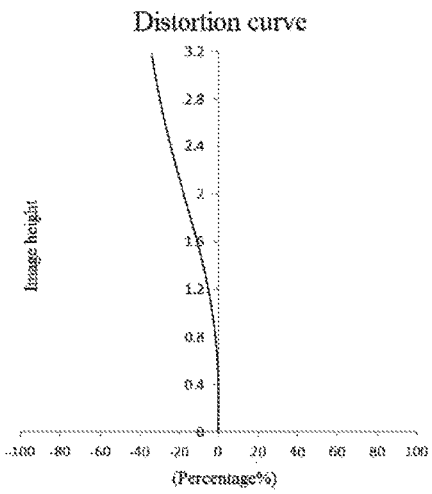
FIG. 34 is a diagram showing a distortion curve (%) of the camera lens in embodiment 7.
Figure 35:
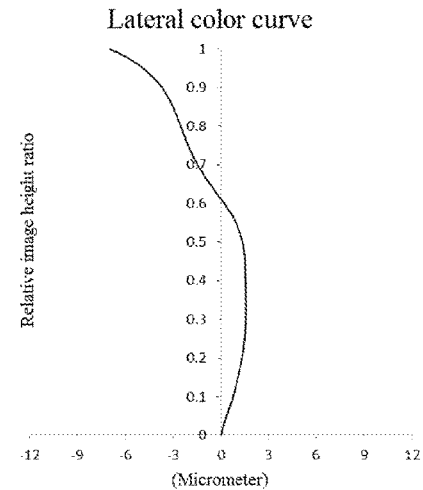
FIG. 35 is a diagram showing a lateral color curve (μm) of the camera lens in embodiment 7.
Figure 36:
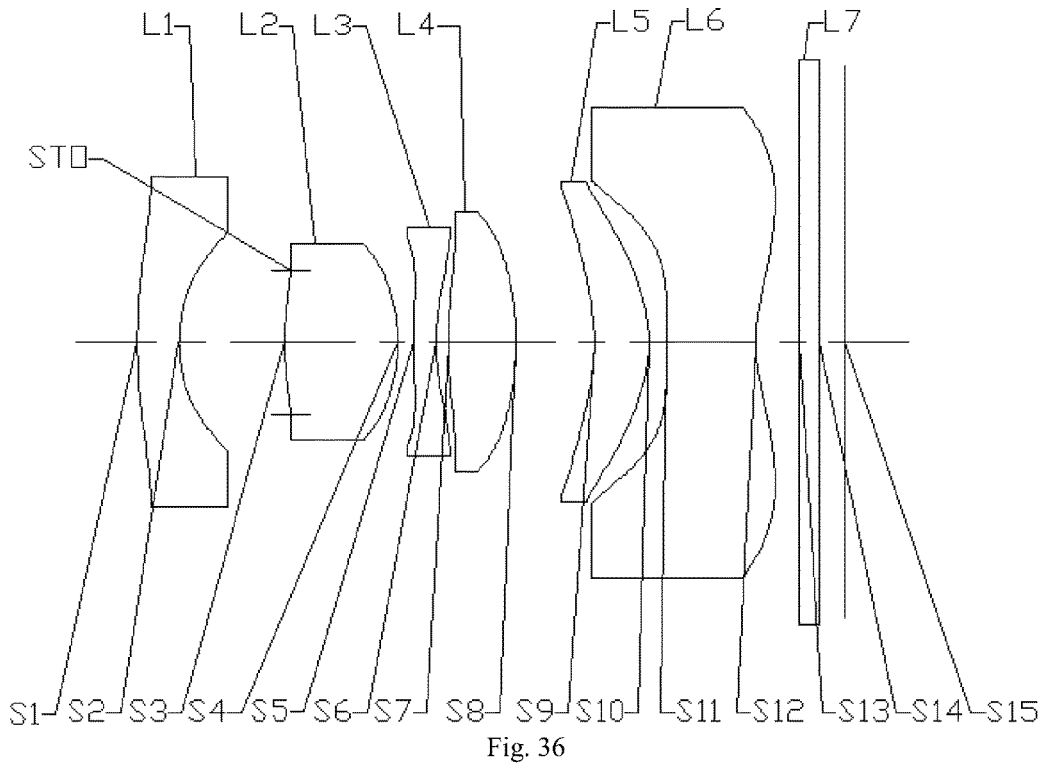
FIG. 36 is a schematic view of a camera lens according to embodiment 8.
Figure 37:
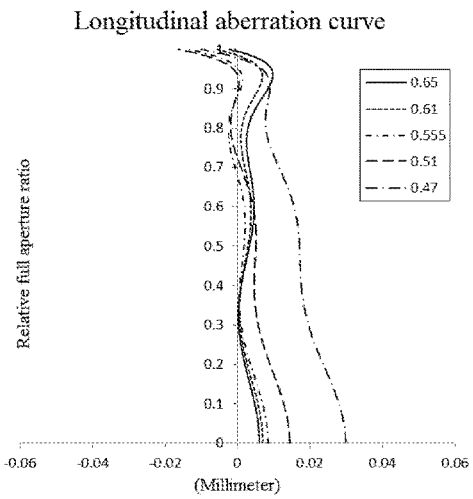
FIG. 37 is a diagram showing a longitudinal aberration curve (mm) of the camera lens in embodiment 8.
Figure 38:
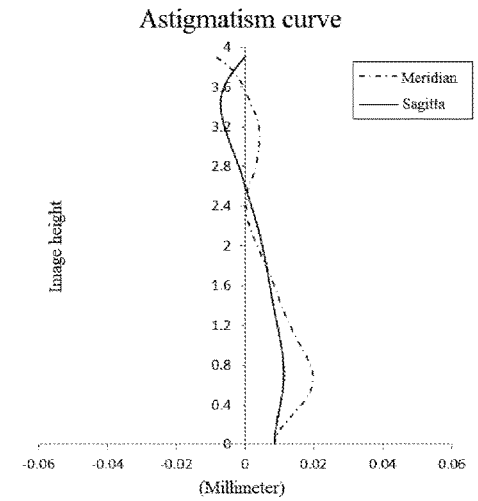
FIG. 38 is a diagram showing an astigmatism curve (mm) of the camera lens in embodiment 8.
Figure 39:
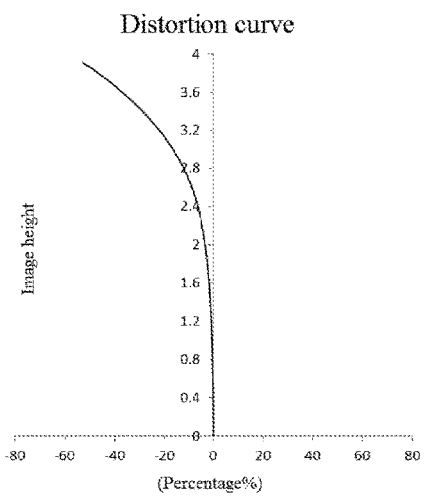
FIG. 39 is a diagram showing a distortion curve (%) of the camera lens in embodiment 8.
Figure 40:
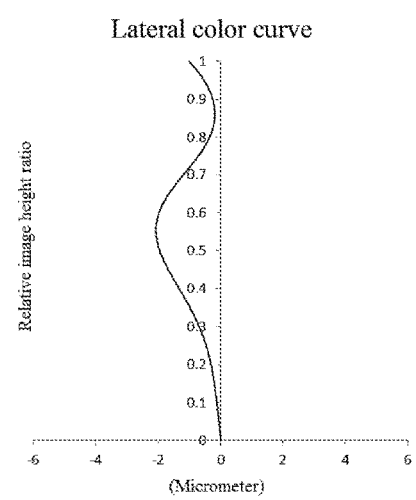
FIG. 40 is a diagram showing a lateral color curve (μm) of the camera lens in embodiment 8.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the description of the present disclosure, it should be understood that terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, the term "a plurality of means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relational expressions between different embodiments and/or settings. Furthermore, examples of different processes and materials are provided in the present disclosure. However, it would be appreciated by those skilled in the art that other processes and/or materials may be also applied.

Referring to FIG. 1, a camera lens according to a preferable embodiment of the present disclosure, in sequence from an object side to an image side, includes:

a first lens L1 having a negative refractive power, in which an image-side surface S2 of the first lens L1 is configured as a concave surface;

a second lens L2 having a positive refractive power, in which an object-side surface S3 of the second lens L2 is configured as a convex surface, and an image-side surface S4 of the second lens L2 is configured as a convex surface;

a third lens L3 having a negative refractive power, in which an image-side surface S6 of the third lens L3 is configured as a concave surface;

a fourth lens L4 having a refractive power;

a fifth lens L5 having a positive refractive power, in which an image-side surface S10 of the fifth lens is configured as a convex surface;

a sixth lens L6 having a negative refractive power, in which an image-side surface S12 of the sixth lens L6 is configured as a concave surface.

The camera lens satisfies a following a relational expression:

$2<\tan(HFOV)<9$, in which HFOV denotes a half of a largest field angle of the camera lens.

The camera lens satisfying the above configuration may achieve an ultra-wide angle, have a homogeneous image quality and a high restoration, and may be applied to image acquisition devices of various imaging fields. Moreover, the camera lens satisfying the above configuration is miniaturized and compact in structure.

Preferably, the camera lens satisfies a following relational expression: $1<f5/f<2.5$, in which f5 denotes an effective focal length of the fifth lens L5; f denotes an effective focal length of the camera lens.

The camera lens satisfying the above expression allows rays to converge at the fifth lens L5 effectively and smoothly, so as to reasonably share an optical aberration of the system, thereby improving an imaging quality and facilitating feasibility of production and manufacture of the fifth lens L5.

Preferably, the camera lens satisfies a following relational expression: $-2<f1/f2<0$, in which f1 denotes an effective focal length of the first lens L1; f2 denotes an effective focal length of the second lens L2.

The camera lens satisfying the above expression may reasonably configure a shape and a refractive power of the lens, which is beneficial for effectively correcting various optical aberrations while ensuring miniaturization of the camera lens, thus improving the imaging quality of the camera lens.

Preferably, the camera lens satisfies a following relational expression: $|SAG62/DT62|<0.2$, in which SAG62 denotes an axial distance from an intersection point of the image-side surface S12 of the sixth lens L6 with an optical axis to a vertex of an effective radius of the image-side surface S12 of the sixth lens L6; DT62 denotes the effective radius of the image-side surface S12 of the sixth lens L6.

The camera lens satisfying the above expression further defines a shape of the sixth lens L6, so as to ensure the amount of rays that pass through the sixth lens L6, thereby ensuring the amount of rays pass through a photosensitive element and improving a relative illumination.

Preferably, the camera lens satisfies a following relational expression: $T23/T12<0.2$, in which T23 denotes an axial spacing distance between the second lens L2 and the third lens L3; T12 denotes an axial spacing distance between the first lens L1 and the second lens L2.

The camera lens satisfying the above expression contributes to reducing the distance among respective lenses, thereby shortening a total length of the camera lens and further ensuring the miniaturization of the camera lens.

Preferably, the camera lens satisfies a following relational expression: $0.5<R2/R3<1.5$, in which R2 denotes a radius of curvature of the image-side surface S2 of the first lens L1; R3 denotes a radius of curvature of the object-side surface S3 of the second lens L2.

The camera lens satisfying the above expression has a relatively homogeneous overall image quality from center to margin, thereby facilitating an improvement of the imaging quality.

Preferably, the camera lens satisfies a following relational expression: $0<Dr5r8/TTL<0.5$, in which Dr5r8 denotes an axial distance from the object-side surface S5 of the third lens L3 to an image-side surface S8 of the fourth lens L4; TTL denotes an axial distance from the object-side surface S1 of the first lens L1 to an imaging surface S15.

The camera lens satisfying the above expression may be miniaturized and simplified, so as to be carried on a light and portable electronic product.

Preferably, the camera lens satisfies a following relational expression: $1<DT12/DT21<2$, in which DT12 denotes an effective radius of the image-side surface S2 of the first lens L1; DT21 denotes an effective radius of the object-side surface S3 of the second lens L2.

The camera lens satisfying the above expression contributes to a uniform allocation of apertures of the lenses, thereby reducing a volume of the camera lens effectively, allowing the lenses to be assembled easily and also reducing sensibility of the camera lens.

Preferably, the camera lens satisfies a following relational expression: $-2<f6/f<-0.8$, in which f6 denotes an effective focal length of the sixth lens L6; f denotes the effective focal length of the camera lens.

The camera lens satisfying the above expression contributes to a gentle ray angle of the camera lens while allowing the camera lens to be miniaturized, thereby reducing a tolerance sensibility of the camera lens and allowing the camera lens to be processed and assembled easily.

Preferably, the object-side surface S5 of the third lens L3 is configured as a convex surface, an object-side surface S7 of the fourth lens L4 is configured as a convex surface, and the image-side surface S8 of the fourth lens L4 is configured as a convex surface.

During imaging, rays pass through the six lenses, then further through an optical filter L7 having an object-side surface S13 and an image-side surface S14, and finally is imaged at the imaging surface S15.

In some embodiments, the first lens L1, the second lens L2, the third lens L3, the fourth lens L4, the fifth lens L5 and the sixth lens L6 each are configured as an aspherical lens.

A surface shape of an aspheric surface is defined by a following formula:

$$x = \frac{ch^2}{1+\sqrt{1-(k+1)c^2h^2}} + \sum A_i h^i,$$

in which, h denotes a height from any point in the aspheric surface to the optical axis, c denotes a vertex curvature, k denotes a conic coefficient, Ai denotes an i-th ordercorrection coefficient of the aspheric surface.

Embodiment 1

Referring to FIG. 1 to FIG. 5, in embodiment 1, the camera lens satisfies conditions shown in following tables 1-3:

TABLE 1

| Surface Number | Surface Type | Radius of Curvature | Thickness | Material | Conic Coefficient |
|---|---|---|---|---|---|
| OBJ | Spherical Surface | Infinite | 400.0000 | — | — |
| S1 | Aspheric Surface | −1.8318 | 0.3546 | 1.535/55.80 | −31.5144 |
| S2 | Aspheric Surface | 3.0511 | 0.5816 | — | 10.6948 |
| STO | Spherical Surface | Infinite | 0.0227 | — | — |
| S3 | Aspheric Surface | 4.0475 | 0.6345 | 1.544/56.11 | −43.8554 |
| S4 | Aspheric Surface | −0.6990 | 0.0300 | — | −1.3284 |

TABLE 1-continued

| Surface Number | Surface Type | Radius of Curvature | Thickness | Material | Conic Coefficient |
|---|---|---|---|---|---|
| S5 | Aspheric Surface | 19.0790 | 0.2400 | 1.651/21.52 | 50.0000 |
| S6 | Aspheric Surface | 1.1694 | 0.0893 | — | −14.3114 |
| S7 | Aspheric Surface | 6.8280 | 0.5708 | 1.544/56.11 | 31.4200 |
| S8 | Aspheric Surface | −38.0028 | 0.0300 | — | 50.0000 |
| S9 | Aspheric Surface | 1.4454 | 0.7053 | 1.544/56.11 | −4.4155 |
| S10 | Aspheric Surface | −1.9242 | 0.0499 | — | −33.7153 |
| S11 | Aspheric Surface | 1.7312 | 0.3200 | 1.651/21.52 | −5.5354 |
| S12 | Aspheric Surface | 0.7208 | 0.2000 | — | −2.3916 |
| S13 | Spherical Surface | Infinite | 0.2100 | 1.517/64.17 | — |
| S14 | Spherical Surface | Infinite | 0.3914 | — | — |
| S15 | Spherical Surface | Infinite | — | — | — |

The following table shows high-order term coefficients A4, A6, A8, A10, A12, A14 and A16 of the aspheric surface of the aspherical lens.

TABLE 2

| Surface Number | A4 | A6 | A8 | A10 | A12 | A14 | A16 |
|---|---|---|---|---|---|---|---|
| S1 | 3.1859E−01 | −3.3485E−01 | 2.6021E−01 | −1.2989E−01 | 3.5450E−02 | −4.0838E−03 | 0 |
| S2 | 1.2031E+00 | −2.9364E+00 | 1.5539E+01 | −5.5232E+01 | 1.1919E+02 | −1.1672E+02 | 2.5360E+01 |
| S3 | −1.2971E−01 | −2.0881E+00 | 1.8924E+01 | −2.0116E+02 | 9.8407E+02 | −2.1785E+03 | 0 |
| S4 | 6.4539E−01 | −7.6792E+00 | 3.7887E+01 | −1.3643E+02 | 2.7435E+02 | −2.4775E+02 | 0 |
| S5 | −8.9440E−02 | −2.2648E+00 | 1.0283E+01 | −2.9874E+01 | 4.6861E+01 | −2.9248E+01 | 0 |
| S6 | 1.5182E−01 | −7.8346E−01 | 2.1010E+00 | −3.6305E+00 | 3.5037E+00 | −1.4859E+00 | 0 |
| S7 | 2.8820E−01 | −1.0525E+00 | 2.7324E+00 | −4.0449E+00 | 3.2266E+00 | −1.0644E+00 | 0 |
| S8 | −2.5051E−02 | −1.9788E+00 | 4.6125E+00 | −5.8035E+00 | 4.3620E+00 | −1.3380E+00 | 0 |
| S9 | 2.1329E−01 | −1.4274E+00 | 3.1423E+00 | −5.6008E+00 | 6.1905E+00 | −3.6509E+00 | 9.0248E−01 |
| S10 | 6.8106E−02 | 8.7638E−01 | −3.8537E+00 | 5.5037E+00 | −3.9697E+00 | 1.4621E+00 | −2.0949E−01 |
| S11 | −4.4713E−01 | −4.8364E−01 | 6.7428E−01 | 7.2571E−02 | −5.0254E−01 | 3.0911E−01 | −6.1250E−02 |
| S12 | −6.6526E−01 | 6.3098E−01 | −3.4215E−01 | 1.1189E−01 | −2.1843E−02 | 2.4344E−03 | −1.4498E−04 |

TABLE 3

| f1(mm) | −2.097 | f(mm) | 1.278 |
|---|---|---|---|
| f2(mm) | 1.155 | Fno | 2.273 |
| f3(mm) | −1.947 | TTL(mm) | 4.430 |
| f4(mm) | 10.739 | HFOV(°) | 73.000 |
| f5(mm) | 1.646 | | |
| f6(mm) | −2.192 | | |

Embodiment 2

Referring to FIG. 6-FIG. 10, in embodiment 2, the camera lens satisfies conditions shown in following tables 4-6:

TABLE 4

| Surface Number | Surface Type | Radius of Curvature | Thickness | Material | Conic Coefficient |
|---|---|---|---|---|---|
| OBJ | Spherical Surface | Infinite | 400.0000 | — | — |
| S1 | Aspheric Surface | −1.8921 | 0.3717 | 1.535/55.80 | −33.0516 |
| S2 | Aspheric Surface | 3.0008 | 0.5559 | — | 10.5914 |
| STO | Spherical Surface | Infinite | 0.0227 | — | — |
| S3 | Aspheric Surface | 3.9647 | 0.6506 | 1.544/56.11 | −31.3982 |
| S4 | Aspheric Surface | −0.7019 | 0.0316 | — | −1.3329 |
| S5 | Aspheric Surface | 18.8697 | 0.2390 | 1.651/21.52 | 253.1804 |
| S6 | Aspheric Surface | 1.1710 | 0.0891 | — | −14.2619 |
| S7 | Aspheric Surface | 6.8441 | 0.5705 | 1.544/56.11 | 31.6383 |
| S8 | Aspheric Surface | −38.2790 | 0.0276 | — | −669.0409 |
| S9 | Aspheric Surface | 1.4629 | 0.7057 | 1.544/56.11 | −4.2665 |
| S10 | Aspheric Surface | −1.8191 | 0.0448 | — | −33.4772 |
| S11 | Aspheric Surface | 1.6761 | 0.3055 | 1.651/21.52 | −5.5091 |
| S12 | Aspheric Surface | 0.7190 | 0.2165 | — | −2.4985 |
| S13 | Spherical Surface | Infinite | 0.2100 | 1.517/64.17 | — |
| S14 | Spherical Surface | Infinite | 0.3825 | — | — |
| S15 | Spherical Surface | Infinite | 3.8516 | — | — |

TABLE 5

| Surface Number | A4 | A6 | A8 | A10 | A12 | A14 | A16 |
|---|---|---|---|---|---|---|---|
| S1 | 3.2069E-01 | -3.3384E-01 | 2.6063E-01 | -1.2973E-01 | 3.5486E-02 | -4.1330E-03 | 0 |
| S2 | 1.2047E+00 | -2.9394E+00 | 1.5528E+01 | -5.5267E+01 | 1.1919E+02 | -1.1710E+02 | 2.5347E+01 |
| S3 | -1.2400E-01 | -2.2329E+00 | 1.8797E+01 | -1.9575E+02 | 1.0218E+03 | -2.3310E+03 | 0 |
| S4 | 6.4697E-01 | -7.6829E+00 | 3.7971E+01 | -1.3507E+02 | 2.7220E+02 | -2.4780E+02 | 0 |
| S5 | -8.5299E-02 | -2.2412E+00 | 1.0326E+01 | -3.0086E+01 | 4.6814E+01 | -2.9282E+01 | 0 |
| S6 | 1.5107E-01 | -7.8688E-01 | 2.0940E+00 | -3.6410E+00 | 3.5146E+00 | -1.4848E+00 | 0 |
| S7 | 2.8820E-01 | -1.0519E+00 | 2.7342E+00 | -4.0407E+00 | 3.2325E+00 | -1.0675E+00 | 0 |
| S8 | -2.3444E-02 | -1.9761E+00 | 4.6148E+00 | -5.8028E+00 | 4.3619E+00 | -1.3427E+00 | 0 |
| S9 | 2.1066E-01 | -1.4312E+00 | 3.1397E+00 | -5.6020E+00 | 6.1902E+00 | -3.6508E+00 | 9.0250E-01 |
| S10 | 7.0545E-02 | 8.7812E-01 | -3.8533E+00 | 5.5036E+00 | -3.9698E+00 | 1.4621E+00 | -2.0918E-01 |
| S11 | -4.4755E-01 | -4.8413E-01 | 6.7391E-01 | 7.2028E-02 | -5.0346E-01 | 3.0801E-01 | -6.2636E-02 |
| S12 | -6.5866E-01 | 6.3145E-01 | -3.4209E-01 | 1.1190E-01 | -2.1842E-02 | 2.4347E-03 | -1.4574E-04 |

The following table shows high-order term coefficients A4, A6, A8, A10, A12, A14 and A16 of the aspheric surface of the aspherical lens.

TABLE 6

| f1(mm) | -2.106 | f(mm) | 1.277 |
|---|---|---|---|
| f2(mm) | 1.149 | Fno | 2.000 |
| f3(mm) | -1.912 | TTL(mm) | 4.424 |
| f4(mm) | 10.683 | HFOV(°) | 68.488 |

TABLE 6-continued

| f5(mm) | 1.607 |
|---|---|
| f6(mm) | -2.196 |

Embodiment 3

Referring to FIG. 11 to FIG. 15, in embodiment 3, the camera lens satisfies conditions shown in following tables 7-9:

TABLE 7

| Surface Number | Surface Type | Radius of Curvature | Thickness | Material | Conic Coefficient |
|---|---|---|---|---|---|
| OBJ | Spherical Surface | Infinite | 400.0000 | — | — |
| S1 | Aspheric Surface | -1.9045 | 0.3684 | 1.535/55.80 | -34.2712 |
| S2 | Aspheric Surface | 3.0239 | 0.5481 | — | 10.2764 |
| STO | Spherical Surface | Infinite | 0.0227 | — | — |
| S3 | Aspheric Surface | 3.8680 | 0.6685 | 1.544/56.11 | -24.8830 |
| S4 | Aspheric Surface | -0.7053 | 0.0318 | — | -1.3499 |
| S5 | Aspheric Surface | 18.9154 | 0.2388 | 1.651/21.52 | 308.0534 |
| S6 | Aspheric Surface | 1.1708 | 0.0854 | — | -14.2357 |
| S7 | Aspheric Surface | 6.8541 | 0.5690 | 1.544/56.11 | 31.8325 |
| S8 | Aspheric Surface | -38.0656 | 0.0296 | — | -533.5869 |
| S9 | Aspheric Surface | 1.4632 | 0.7052 | 1.544/56.11 | -4.1652 |
| S10 | Aspheric Surface | -1.7838 | 0.0432 | — | -33.5947 |
| S11 | Aspheric Surface | 1.6691 | 0.3033 | 1.651/21.52 | -5.5461 |
| S12 | Aspheric Surface | 0.7147 | 0.2166 | — | -2.4836 |
| S13 | Spherical Surface | Infinite | 0.2100 | 1.517/64.17 | — |
| S14 | Spherical Surface | Infinite | 0.3794 | — | — |
| S15 | Spherical Surface | Infinite | 3.9044 | — | — |

TABLE 8

| Surface Number | A4 | A6 | A8 | A10 | A12 | A14 | A16 |
|---|---|---|---|---|---|---|---|
| S1 | 3.2147E-01 | -3.3342E-01 | 2.6081E-01 | -1.2966E-01 | 3.5491E-02 | -4.1784E-03 | 0 |
| S2 | 1.2004E+00 | -2.9463E+00 | 1.5523E+01 | -5.5262E+01 | 1.1919E+02 | -1.1722E+02 | 2.5360E+01 |
| S3 | -1.1014E-01 | -2.0772E+00 | 1.8748E+01 | -2.0341E+02 | 9.9886E+02 | -2.0169E+03 | 0 |
| S4 | 6.5257E-01 | -7.6431E+00 | 3.8142E+01 | -1.3511E+02 | 2.7234E+02 | -2.4775E+02 | 0 |
| S5 | -8.4317E-02 | -2.2264E+00 | 1.0391E+01 | -3.0333E+01 | 4.7132E+01 | -2.9248E+01 | 0 |
| S6 | 1.5098E-01 | -7.8774E-01 | 2.0924E+00 | -3.6308E+00 | 3.5449E+00 | -1.4859E+00 | 0 |
| S7 | 2.8826E-01 | -1.0515E+00 | 2.7362E+00 | -4.0334E+00 | 3.2431E+00 | -1.0811E+00 | 0 |
| S8 | -2.3433E-02 | -1.9754E+00 | 4.6160E+00 | -5.8018E+00 | 4.3620E+00 | -1.3456E+00 | 0 |
| S9 | 2.1050E-01 | -1.4322E+00 | 3.1389E+00 | -5.6026E+00 | 6.1899E+00 | -3.6509E+00 | 9.0248E-01 |
| S10 | 7.1575E-02 | 8.7886E-01 | -3.8530E+00 | 5.5035E+00 | -3.9700E+00 | 1.4621E+00 | -2.0915E-01 |
| S11 | -4.4798E-01 | -4.8442E-01 | 6.7377E-01 | 7.1883E-02 | -5.0375E-01 | 3.0753E-01 | -6.3313E-02 |
| S12 | -6.5770E-01 | 6.3153E-01 | -3.4204E-01 | 1.1193E-01 | -2.1825E-02 | 2.4344E-03 | -1.4165E-04 |

The following table shows high-order term coefficients A4, A6, A8, A10, A12, A14 and A16 of the aspheric surface of the aspherical lens.

TABLE 9

| f1(mm) | −2.122 | f(mm) | 1.279 |
|---|---|---|---|
| f2(mm) | 1.152 | Fno | 1.930 |
| f3(mm) | −1.912 | TTL(mm) | 4.420 |
| f4(mm) | 10.687 | HFOV(°) | 66.220 |
| f5(mm) | 1.595 | | |
| f6(mm) | −2.178 | | |

Embodiment 4

Referring to FIG. 16 to FIG. 20, in embodiment 4, the camera lens satisfies conditions shown in following tables 10-12:

TABLE 10

| Surface Number | Surface Type | Radius of Curvature | Thickness | Material | Conic Coefficient |
|---|---|---|---|---|---|
| OBJ | Spherical Surface | Infinite | 331.3809 | — | — |
| S1 | Aspheric Surface | −1.5365 | 0.2900 | 1.544/56.11 | −32.3701 |
| S2 | Aspheric Surface | 2.5346 | 0.4759 | — | 10.5156 |
| STO | Spherical Surface | Infinite | 0.0188 | — | — |
| S3 | Aspheric Surface | 3.3454 | 0.5233 | 1.544/56.11 | −45.8173 |
| S4 | Aspheric Surface | −0.5783 | 0.0300 | — | −1.3146 |
| S5 | Aspheric Surface | 14.3088 | 0.1911 | 1.651/21.52 | 243.2430 |
| S6 | Aspheric Surface | 0.9760 | 0.0734 | — | −14.4559 |
| S7 | Aspheric Surface | 5.6664 | 0.4739 | 1.544/56.11 | 31.5911 |
| S8 | Aspheric Surface | −36.6253 | 0.0245 | — | −1430.9160 |
| S9 | Aspheric Surface | 1.2055 | 0.5799 | 1.544/56.11 | −4.4618 |
| S10 | Aspheric Surface | −1.5638 | 0.0398 | — | −32.9006 |
| S11 | Aspheric Surface | 1.3779 | 0.2546 | 1.651/21.52 | −5.5257 |
| S12 | Aspheric Surface | 0.5829 | 0.1730 | — | −2.3994 |
| S13 | Spherical Surface | Infinite | 0.1740 | 1.517/64.17 | — |
| S14 | Spherical Surface | Infinite | 0.3086 | — | — |
| S15 | Spherical Surface | Infinite | 3.3121 | — | — |

TABLE 11

| Surface Number | A4 | A6 | A8 | A10 | A12 | A14 | A16 |
|---|---|---|---|---|---|---|---|
| S1 | 5.6077E−01 | −8.5835E−01 | 9.7117E−01 | −7.0677E−01 | 2.8095E−01 | −4.7121E−02 | 0 |
| S2 | 2.1181E+00 | −7.5308E+00 | 5.7984E+01 | −3.0056E+02 | 9.4446E+02 | −1.3485E+03 | 4.2471E+02 |
| S3 | −2.3396E−01 | −5.4107E+00 | 7.0307E+01 | −1.0968E+03 | 7.7785E+03 | −2.5397E+04 | 0 |
| S4 | 1.1289E+00 | −1.9678E+01 | 1.4149E+02 | −7.4221E+02 | 2.1725E+03 | −2.8799E+03 | 0 |
| S5 | −1.4820E−01 | −5.7927E+00 | 3.8382E+01 | −1.6263E+02 | 3.7094E+02 | −3.3904E+02 | 0 |
| S6 | 2.6711E−01 | −2.0077E+00 | 7.8421E+00 | −1.9754E+01 | 2.7775E+01 | −1.7159E+01 | 0 |
| S7 | 5.0681E−01 | −2.6960E+00 | 1.0205E+01 | −2.1999E+01 | 2.5580E+01 | −1.2297E+01 | 0 |
| S8 | −4.0468E−02 | −5.0676E+00 | 1.7222E+01 | −3.1574E+01 | 3.4563E+01 | −1.5472E+01 | 0 |
| S9 | 3.6974E−01 | −3.6643E+00 | 1.1728E+01 | −3.0468E+01 | 4.9070E+01 | −4.2154E+01 | 1.5198E+01 |
| S10 | 1.2118E−01 | 2.2470E+00 | −1.4388E+01 | 2.9940E+01 | −3.1464E+01 | 1.6885E+01 | −3.5237E+00 |
| S11 | −7.8628E−01 | −1.2400E+00 | 2.5162E+00 | 3.9310E−01 | −3.9848E+00 | 3.5678E+00 | −1.0324E+00 |
| S12 | −1.1679E+00 | 1.6194E+00 | −1.2773E+00 | 6.0845E−01 | −1.7324E−01 | 2.8086E−02 | −2.4360E−03 |

The following table shows high-order term coefficients A4, A6, A8, A10, A12, A14 and A16 of the aspheric surface of the aspherical lens.

TABLE 12

| f1(mm) | −1.709 | f(mm) | 1.062 |
|---|---|---|---|
| f2(mm) | 0.948 | Fno | 2.276 |
| f3(mm) | −1.605 | TTL(mm) | 3.631 |
| f4(mm) | 9.024 | HFOV(°) | 83.005 |
| f5(mm) | 1.347 | | |
| f6(mm) | −1.763 | | |

Embodiment 5

Referring to FIG. 21 to FIG. 25, in embodiment 5, the camera lens satisfies conditions shown in following tables 13-15:

TABLE 13

| Surface Number | Surface Type | Radius of Curvature | Thickness | Material | Conic Coefficient |
|---|---|---|---|---|---|
| OBJ | Spherical Surface | Infinite | 331.3809 | — | — |
| S1 | Aspheric Surface | −1.5376 | 0.2898 | 1.544/56.11 | −32.7519 |
| S2 | Aspheric Surface | 2.5493 | 0.4806 | — | 10.4817 |
| STO | Spherical Surface | Infinite | 0.0188 | — | — |
| S3 | Aspheric Surface | 3.3242 | 0.5217 | 1.544/56.11 | −47.7948 |
| S4 | Aspheric Surface | −0.5779 | 0.0284 | — | −1.3141 |
| S5 | Aspheric Surface | 14.1405 | 0.1906 | 1.651/21.52 | 263.9579 |
| S6 | Aspheric Surface | 0.9783 | 0.0729 | — | −14.5717 |
| S7 | Aspheric Surface | 5.6595 | 0.4723 | 1.544/56.11 | 3.18E+01 |
| S8 | Aspheric Surface | −35.4024 | 0.0251 | — | −1066.1670 |
| S9 | Aspheric Surface | 1.2039 | 0.5797 | 1.544/56.11 | −4.4414 |
| S10 | Aspheric Surface | −1.5623 | 0.0404 | — | −33.0483 |
| S11 | Aspheric Surface | 1.3770 | 0.2542 | 1.651/21.52 | −5.8933 |
| S12 | Aspheric Surface | 0.5794 | 0.1738 | — | −2.3813 |
| S13 | Spherical Surface | Infinite | 0.1740 | 1.517/64.17 | — |
| S14 | Spherical Surface | Infinite | 0.3094 | — | — |
| S15 | Spherical Surface | Infinite | 3.4821 | — | — |

The following table shows high-order term coefficients A4, A6, A8, A10, A12, A14 and A16 of the aspheric surface of the aspherical lens.

TABLE 14

| Surface Number | A4 | A6 | A8 | A10 | A12 | A14 | A16 |
|---|---|---|---|---|---|---|---|
| S1 | 5.5973E−01 | −8.5865E−01 | 9.7109E−01 | −7.0679E−01 | 2.8094E−01 | −4.7129E−02 | 0 |
| S2 | 2.1153E+00 | −7.5186E+00 | 5.8004E+01 | −3.0056E+02 | 9.4431E+02 | −1.3491E+03 | 4.2262E+02 |
| S3 | −2.3594E−01 | −5.3811E+00 | 7.0764E+01 | −1.0926E+03 | 7.8101E+03 | −2.5176E+04 | 0 |
| S4 | 1.1294E+00 | −1.9660E+01 | 1.4160E+02 | −7.4178E+02 | 2.1739E+03 | −2.8768E+03 | 0 |
| S5 | −1.4652E−01 | −5.7902E+00 | 3.8389E+01 | −1.6259E+02 | 3.7116E+02 | −3.3792E+02 | 0 |
| S6 | 2.6624E−01 | −2.0083E+00 | 7.8420E+00 | −1.9753E+01 | 2.7780E+01 | −1.7148E+01 | 0 |
| S7 | 5.0723E−01 | −2.6957E+00 | 1.0204E+01 | −2.2000E+01 | 2.5576E+01 | −1.2306E+01 | 0 |
| S8 | −4.1104E−02 | −5.0686E+00 | 1.7221E+01 | −3.1576E+01 | 3.4562E+01 | −1.5473E+01 | 0 |
| S9 | 3.7060E−01 | −3.6632E+00 | 1.1730E+01 | −3.0466E+01 | 4.9072E+01 | −4.2151E+01 | 1.5202E+01 |
| S10 | 1.2224E−01 | 2.2478E+00 | −1.4388E+01 | 2.9940E+01 | −3.1464E+01 | 1.6885E+01 | −3.5240E+00 |
| S11 | −7.8955E−01 | −1.2411E+00 | 2.5162E+00 | 3.9332E−01 | −3.9845E+00 | 3.5681E+00 | −1.0321E+00 |
| S12 | −1.1673E+00 | 1.6196E+00 | −1.2769E+00 | 6.0944E−01 | −1.7310E−01 | 2.8121E−02 | −2.4247E−03 |

TABLE 15

| f1(mm) | −1.714 | f(mm) | 1.055 |
|---|---|---|---|
| f2(mm) | 0.946 | Fno | 2.040 |
| f3(mm) | −1.611 | TTL(mm) | 3.632 |
| f4(mm) | 8.974 | HFOV(°) | 83.006 |

TABLE 15-continued

| f5(mm) | 1.345 |
|---|---|
| f6(mm) | −1.744 |

Embodiment 6

Referring to FIG. 26 to FIG. 30, in embodiment 6, the camera lens satisfies conditions shown in following tables 16-18:

TABLE 16

| Surface Number | Surface Type | Radius of Curvature | Thickness | Material | Conic Coefficient |
|---|---|---|---|---|---|
| OBJ | Spherical Surface | Infinite | 587.4782 | — | — |
| S1 | Aspheric Surface | −2.7157 | 0.5088 | 1.535/55.80 | −31.6465 |
| S2 | Aspheric Surface | 4.5392 | 0.8522 | — | 10.3852 |
| STO | Spherical Surface | Infinite | 0.0333 | — | — |
| S3 | Aspheric Surface | 5.8639 | 0.9252 | 1.544/56.11 | −51.8940 |
| S4 | Aspheric Surface | −1.0255 | 0.0475 | — | −1.3193 |
| S5 | Aspheric Surface | 24.7678 | 0.3380 | 1.651/21.52 | 276.9184 |
| S6 | Aspheric Surface | 1.7351 | 0.1299 | — | −14.6446 |
| S7 | Aspheric Surface | 10.0662 | 0.8385 | 1.544/56.11 | 31.6615 |
| S8 | Aspheric Surface | −62.8676 | 0.0454 | — | −791.2018 |
| S9 | Aspheric Surface | 2.1377 | 1.0261 | 1.544/56.11 | −4.4640 |
| S10 | Aspheric Surface | −2.7869 | 0.0727 | — | −31.1137 |
| S11 | Aspheric Surface | 2.4367 | 0.4460 | 1.651/21.52 | −5.7849 |
| S12 | Aspheric Surface | 1.0284 | 0.3063 | — | −2.3643 |
| S13 | Spherical Surface | Infinite | 0.3084 | 1.517/64.17 | — |

TABLE 16-continued

| Surface Number | Surface Type | Radius of Curvature | Thickness | Material | Conic Coefficient |
|---|---|---|---|---|---|
| S14 | Spherical Surface | Infinite | 0.5450 | — | — |
| S15 | Spherical Surface | Infinite | 6.0241 | — | — |

TABLE 17

| Surface Number | A4 | A6 | A8 | A10 | A12 | A14 | A16 |
|---|---|---|---|---|---|---|---|
| S1 | 1.0021E−01 | −4.9064E−02 | 1.7641E−02 | −4.0865E−03 | 5.1674E−04 | −2.7580E−05 | 0 |
| S2 | 3.7852E−01 | −4.2897E−01 | 1.0547E+00 | −1.7372E+00 | 1.7370E+00 | −7.8999E−01 | 7.8114E−02 |
| S3 | −4.3463E−02 | −3.0754E−01 | 1.2887E+00 | −6.3066E+00 | 1.4392E+01 | −1.4677E+01 | 0 |
| S4 | 2.0320E−01 | −1.1221E+00 | 2.5736E+00 | −4.2873E+00 | 4.0001E+00 | −1.6827E+00 | 0 |
| S5 | −2.6148E−02 | −3.3046E−01 | 6.9778E−01 | −9.3969E−01 | 6.8311E−01 | −1.9739E−01 | 0 |
| S6 | 4.7726E−02 | −1.1465E−01 | 1.4254E−01 | −1.1416E−01 | 5.1121E−02 | −1.0027E−02 | 0 |
| S7 | 9.1011E−02 | −1.5395E−01 | 1.8540E−01 | −1.2719E−01 | 4.7047E−02 | −7.1991E−03 | 0 |
| S8 | −7.4546E−03 | −2.8946E−01 | 3.1290E−01 | −1.8254E−01 | 6.3578E−02 | −9.0547E−03 | 0 |
| S9 | 6.6563E−02 | −2.0914E−01 | 2.1314E−01 | −1.7613E−01 | 9.0267E−02 | −2.4669E−02 | 2.8316E−03 |
| S10 | 2.1959E−02 | 1.2836E−01 | −2.6142E−01 | 1.7309E−01 | −5.7878E−02 | 9.8822E−03 | −6.5640E−04 |
| S11 | −1.4193E−01 | −7.0925E−02 | 4.5722E−02 | 2.2772E−03 | −7.3278E−03 | 2.0890E−03 | −1.9196E−04 |
| S12 | −2.0888E−01 | 9.2452E−02 | −2.3223E−02 | 3.5212E−03 | −3.1833E−04 | 1.6478E−05 | −4.4880E−07 |

The following table shows high-order term coefficients A4, A6, A8, A10, A12, A14 and A16 of the aspheric surface of the aspherical lens.

TABLE 18

| f1(mm) | −3.090 | f(mm) | 1.875 |
|---|---|---|---|
| f2(mm) | 1.678 | Fno | 2.040 |
| f3(mm) | −2.859 | TTL(mm) | 6.424 |
| f4(mm) | 15.958 | HFOV(°) | 83.006 |
| f5(mm) | 2.392 | | |
| f6(mm) | −3.100 | | |

Embodiment 7

Referring to FIG. 31 to FIG. 35, in embodiment 7, the camera lens satisfies conditions shown in following tables 19-21:

TABLE 19

| Surface Number | Surface Type | Radius of Curvature | Thickness | Material | Conic Coefficient |
|---|---|---|---|---|---|
| OBJ | Spherical Surface | Infinite | 662.9550 | — | — |
| S1 | Aspheric Surface | Infinite | 0.6106 | 1.535/55.80 | −34.2554 |
| S2 | Aspheric Surface | 5.0058 | 0.9071 | — | 10.2327 |
| STO | Spherical Surface | Infinite | 0.0376 | — | — |
| S3 | Aspheric Surface | 6.3960 | 1.1088 | 1.544/56.11 | −25.8401 |
| S4 | Aspheric Surface | −1.1693 | 0.0529 | — | −1.3516 |
| S5 | Aspheric Surface | 31.2734 | 0.3966 | 1.651/21.52 | 308.3661 |
| S6 | Aspheric Surface | 1.9408 | 0.1417 | — | −14.2432 |
| S7 | Aspheric Surface | 11.3603 | 0.9430 | 1.544/56.11 | 31.8418 |
| S8 | Aspheric Surface | −63.1531 | 0.0496 | — | −490.7927 |
| S9 | Aspheric Surface | 2.4248 | 1.1685 | 1.544/56.11 | −4.1558 |
| S10 | Aspheric Surface | −2.9598 | 0.0716 | — | −33.4260 |
| S11 | Aspheric Surface | 2.7574 | 0.5025 | 1.651/21.52 | −5.4919 |
| S12 | Aspheric Surface | 1.1822 | 0.3602 | — | −2.4784 |
| S13 | Spherical Surface | Infinite | 0.3481 | 1.517/64.17 | — |
| S14 | Spherical Surface | Infinite | 0.6272 | — | — |
| S15 | Spherical Surface | Infinite | 6.7875 | — | — |

TABLE 20

| Surface Number | A4 | A6 | A8 | A10 | A12 | A14 | A16 |
|---|---|---|---|---|---|---|---|
| S1 | 7.0634E-02 | -2.6659E-02 | 7.5921E-03 | -1.3740E-03 | 1.3691E-04 | -5.8692E-06 | 0 |
| S2 | 2.6339E-01 | -2.3576E-01 | 4.5182E-01 | -5.8560E-01 | 4.5979E-01 | -1.6461E-01 | 1.2965E-02 |
| S3 | -2.4480E-02 | -1.6626E-01 | 5.4588E-01 | -2.1549E+00 | 3.8549E+00 | -2.8292E+00 | 0 |
| S4 | 1.4344E-01 | -6.1107E-01 | 1.1103E+00 | -1.4318E+00 | 1.0506E+00 | -3.4793E-01 | 0 |
| S5 | -1.8509E-01 | -1.7804E-01 | 3.0245E-01 | -3.2145E-01 | 1.8182E-01 | -4.1076E-02 | 0 |
| S6 | 3.3158E-02 | -6.2987E-02 | 6.0909E-02 | -3.8474E-02 | 1.3675E-02 | -2.0867E-03 | 0 |
| S7 | 6.3316E-02 | -8.4078E-02 | 7.9649E-02 | -4.2742E-02 | 1.2511E-02 | -1.5180E-03 | 0 |
| S8 | -5.1570E-03 | -1.5795E-01 | 1.3437E-01 | -6.1482E-02 | 1.6827E-02 | -1.8899E-03 | 0 |
| S9 | 4.6255E-02 | -1.1452E-01 | 9.1369E-02 | -5.9371E-02 | 2.3879E-02 | -5.1272E-03 | 4.6140E-04 |
| S10 | 1.5723E-02 | 7.0275E-02 | -1.1216E-01 | 5.8321E-02 | -1.5315E-02 | 2.0533E-03 | -1.0694E-04 |
| S11 | -9.8363E-02 | -3.8737E-02 | 1.9612E-02 | 7.6137E-04 | -1.9434E-03 | 4.3187E-04 | -3.2372E-05 |
| S12 | -1.4448E-01 | 5.0507E-02 | -9.9561E-03 | 1.1862E-03 | -8.4197E-05 | 3.4189E-06 | -7.2631E-08 |

The following table shows high-order term coefficients A4, A6, A8, A10, A12, A14 and A16 of the aspheric surface of the aspherical lens.

TABLE 21

| f1(mm) | -3.534 | f(mm) | 2.120 |
|---|---|---|---|
| f2(mm) | 1.910 | Fno | 1.930 |
| f3(mm) | -3.169 | TTL(mm) | 7.326 |
| f4(mm) | 17.715 | HFOV(°) | 66.113 |
| f5(mm) | 2.644 | | |
| f6(mm) | -3.609 | | |

Embodiment 8

Referring to FIG. 36 to FIG. 40, in embodiment 8, the camera lens satisfies conditions shown in following tables 22-24:

TABLE 22

| Surface Number | Surface Type | Radius of Curvature | Thickness | Material | Conic Coefficient |
|---|---|---|---|---|---|
| OBJ | Spherical Surface | Infinite | Infinite | — | — |
| S1 | Aspheric Surface | 10.0819 | 0.5864 | 1.544/56.11 | 0.0180 |
| S2 | Aspheric Surface | 2.2499 | 1.5839 | — | -1.7493 |
| STO | Spherical Surface | Infinite | -0.0840 | — | — |
| S3 | Aspheric Surface | 5.2806 | 1.5886 | 1.544/56.11 | 5.7948 |
| S4 | Aspheric Surface | -2.3709 | 0.2241 | — | 0.2349 |
| S5 | Aspheric Surface | 7.9921 | 0.3169 | 1.651/21.52 | 21.5931 |
| S6 | Aspheric Surface | 2.7938 | 0.1770 | — | -12.3627 |
| S7 | Aspheric Surface | 6.3896 | 0.9518 | 1.544/56.11 | -56.0099 |
| S8 | Aspheric Surface | -4.5317 | 1.1144 | — | 2.3338 |
| S9 | Aspheric Surface | -2.9942 | 0.7674 | 1.544/56.11 | -9.2061 |
| S10 | Aspheric Surface | -1.9621 | 0.2604 | — | -4.9244 |
| S11 | Aspheric Surface | -31.4609 | 1.2479 | 1.640/23.53 | 100.0000 |
| S12 | Aspheric Surface | 2.5371 | 0.6130 | — | -9.8479 |
| S13 | Spherical Surface | Infinite | 0.3000 | 1.517/64.17 | — |
| S14 | Spherical Surface | Infinite | 0.3513 | — | — |
| S15 | Spherical Surface | Infinite | 7.8171 | — | — |

The following table shows high-order term coefficients A4, A6, A8, A10, A12, A14 and A16 of the aspheric surface of the aspherical lens.

TABLE 23

| Surface Number | A4 | A6 | A8 | A10 | A12 | A14 | A16 |
|---|---|---|---|---|---|---|---|
| S1 | 8.1669E-03 | -3.5897E-03 | 2.8393E-04 | 9.3893E-06 | -1.4643E-06 | 0 | 0 |
| S2 | 4.0243E-02 | -3.3716E-03 | 8.2770E-04 | -7.2892E-04 | 2.1797E-04 | 0 | 0 |
| S3 | -9.7669E-03 | -1.2952E-02 | 1.2704E-02 | -1.3546E-02 | 3.9171E-03 | 0 | 0 |
| S4 | 1.8027E-02 | -2.2418E-02 | 1.1006E-02 | -3.7047E-03 | 3.8832E-04 | 0 | 0 |
| S5 | -5.3262E-02 | 1.0737E-03 | -1.2083E-03 | 2.3683E-04 | -9.4218E-05 | 0 | 0 |
| S6 | -1.6441E-02 | 1.2608E-03 | -6.0394E-04 | 3.3968E-04 | -3.4694E-05 | 0 | 0 |
| S7 | -9.7316E-04 | -5.3976E-04 | -4.6414E-05 | -2.5116E-04 | 4.5712E-05 | 0 | 0 |

TABLE 23-continued

| Surface Number | A4 | A6 | A8 | A10 | A12 | A14 | A16 |
|---|---|---|---|---|---|---|---|
| S8  | −2.3786E−03 | −7.1878E−04 | −1.3149E−04 | 3.6352E−06 | −2.2876E−05 | 0 | 0 |
| S9  | 8.0713E−03  | −2.1473E−03 | −1.5268E−04 | 6.3980E−05 | −1.9976E−06 | 0 | 0 |
| S10 | −5.3619E−03 | −8.9729E−04 | −6.5108E−05 | 1.6137E−05 | 6.3614E−06  | 0 | 0 |
| S11 | −4.1977E−02 | −3.2186E−03 | 7.5365E−04  | 7.4068E−06 | −1.0859E−06 | 7.1137E−07 | −3.9165E−09 |
| S12 | −1.5510E−02 | 1.6677E−03  | −1.5017E−04 | 3.8835E−06 | 3.1083E−08  | 1.3777E−08 | −5.6897E−10 |

TABLE 24

| | | | |
|---|---|---|---|
| f1(mm) | −5.449 | f(mm)   | 3.853 |
| f2(mm) | 3.234  | Fno     | 2.440 |
| f3(mm) | −6.706 | TTL(mm) | 9.999 |
| f4(mm) | 5.011  | HFOV(°) | 65.000 |
| f5(mm) | 8.257  |         |       |
| f6(mm) | −3.591 |         |       |

In embodiments 1-8, various conditional expressions satisfy conditions shown in the following table.

| Conditional Expression | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|
| tan(HFOV)    | 3.271  | 2.537  | 2.269  | 8.151  | 8.151  | 8.152  | 2.258  | 2.145  |
| f5/f         | 1.287  | 1.258  | 1.247  | 1.268  | 1.275  | 1.276  | 1.247  | 2.143  |
| f1/G         | −1.815 | −1.833 | −1.841 | −1.803 | −1.811 | −1.841 | −1.851 | −1.685 |
| |SAG62/DT62| | 0.090  | 0.107  | 0.123  | 0.061  | 0.099  | 0.103  | 0.125  | 0.053  |
| T23/T12      | 0.050  | 0.055  | 0.056  | 0.061  | 0.057  | 0.040  | 0.056  | 0.149  |
| R2/R3        | 0.754  | 0.757  | 0.782  | 0.758  | 0.767  | 0.774  | 0.783  | 0.997  |
| Dr5r8/TTL    | 0.203  | 0.203  | 0.202  | 0.203  | 0.203  | 0.203  | 0.202  | 0.145  |
| DT12/DT21    | 1.780  | 1.626  | 1.564  | 1.757  | 1.646  | 1.646  | 1.771  | 1.514  |
| f6/f         | −1.714 | −1.719 | −1.703 | −1.659 | −1.654 | −1.653 | −1.702 | −0.932 |

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance. Thus, the feature defined with "first" and "second" may comprise one or more this feature. In the description of the present disclosure, the term "a plurality of" means two or more than two, unless specified otherwise.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A camera lens, in sequence from an object side to an image side, comprising:

a first lens having a negative refractive power, an image-side surface of the first lens being configured as a concave surface;

a second lens having a positive refractive power, an object-side surface of the second lens being configured as a convex surface, and an image-side surface of the second lens being configured as a convex surface;

a third lens having a negative refractive power, an image-side surface of the third lens being configured as a concave surface;

a fourth lens having a refractive power;

a fifth lens having a positive refractive power, an image-side surface of the fifth lens being configured as a convex surface;

a sixth lens having a negative refractive power, an image-side surface of the sixth lens being configured as a concave surface;

wherein the camera lens satisfies a following relational expression: $2<\tan(HFOV)<9$, in which HFOV denotes a half of a largest field angle of the camera lens, wherein the camera lens satisfies a following relational expression: $|SAG62/DT62|<0.2$, in which SAG62 denotes an axial distance from an intersection point of the image-side surface of the sixth lens with an optical axis to a vertex of an effective radius of the image-side surface of the sixth lens; DT62 denotes the effective radius of the image-side surface of the sixth lens.

2. The camera lens according to claim 1, wherein the camera lens satisfies a following relational expression: $1<f5/f<2.5$, in which f5 denotes an effective focal length of the fifth lens; f denotes an effective focal length of the camera lens.

3. The camera lens according to claim 1, wherein the camera lens satisfies a following relational expression: $-2<f1/f2<0$, in which f1 denotes an effective focal length of the first lens; f2 denotes an effective focal length of the second lens.

4. The camera lens according to claim 1, wherein the camera lens satisfies a following relational expression: $T23/T12<0.2$, in which T23 denotes an axial spacing distance between the second lens and the third lens; T12 denotes an axial spacing distance between the first lens and the second lens.

5. The camera lens according to claim 1, wherein the camera lens satisfies a following relational expression: $0.5<R2/R3<1.5$, in which R2 denotes a radius of curvature of the image-side surface of the first lens; R3 denotes a radius of curvature of the object-side surface of the second lens.

6. The camera lens according to claim 1, wherein the camera lens satisfies a following relational expression: $0<Dr5r8/TTL<0.5$, in which Dr5r8 denotes an axial distance from an object-side surface of the third lens to an image-side surface of the fourth lens; TTL denotes an axial distance from an object-side surface of the first lens to an imaging surface.

7. The camera lens according to claim I, wherein the camera lens satisfies a following relational expression: $1<DT12/1DT21<2$, in which DT12 denotes an effective radius of the image-side surface of the first lens; DT21 denotes an effective radius of the object-side surface of the second lens.

8. The camera lens according to claim I, wherein the camera lens satisfies a following relational expression: $-2<f6/f<-0.8$, in which f6 denotes an effective focal length of the sixth lens; f denotes an effective focal length of the camera lens.

9. The camera lens according to claim 1, wherein an object-side surface of the third lens is configured as a convex surface, an object-side surface of the fourth lens is configured as a convex surface, and an image-side surface of the fourth lens is configured as a convex surface.

\* \* \* \* \*

UNITED STATES PATENT AND TRADEMARK OFFICE
CERTIFICATE OF CORRECTION

PATENT NO. : 10,197,776 B2
APPLICATION NO. : 15/552070
DATED : February 5, 2019
INVENTOR(S) : Zhidong Yin et al.

It is certified that error appears in the above-identified patent and that said Letters Patent is hereby corrected as shown below:

On the Title Page

In item (30) Foreign Application Priority Data, the reference "2016102044554" should read -- 201610204455.4 --, In item (56) References Cited, in Other Publications, entry 1, the application number "PCT/CN2016/088826" should read -- PCT/CN2016/088626 --, In the Claims At Column 21, Claim number 7, Line number 16, the formula "1<DT12/1DT21<2" should read -- 1<DT12/DT21<2 --.

Signed and Sealed this
Thirteenth Day of August, 2019

Andrei Iancu
*Director of the United States Patent and Trademark Office*